March 6, 1951 T. L. GOTTIER 2,544,311

RECEIVING SYSTEM FOR ELECTRIC WAVES

Original Filed Feb. 27, 1943

INVENTOR
THOMAS L. GOTTIER
BY H. S. Grover
ATTORNEY

Patented Mar. 6, 1951

2,544,311

UNITED STATES PATENT OFFICE 2,544,311

RECEIVING SYSTEM FOR ELECTRIC WAVES

Thomas L. Gottier, Princeton, N. J., assignor to Radio Corporation of America, a corporation of Delaware Original application February 27, 1943, Serial No. 477,339. Divided and this application January 9, 1946, Serial No. 639,996

1 Claim. (Cl. 250—20)

The present invention relates to the reception of electric waves, and more particularly to the reception, substantially without interference from unwanted noise components, of transmitted modulated waves of which one complete side band and only a portion or substantially a portion of the remaining side band is utilized for the transmission of intelligence. This invention is a division of my copending application, Serial No. 477,339, which was filed February 27, 1943, now Patent No. 2,394,544, granted February 12, 1946.

A system of transmission in which one side band is partially suppressed is employed at the present time for transmitting image intelligence in television systems. Phase and frequency modulations of the received signals are very often present and appear in the demodulated output of the receiver as interfering signals usually referred to as "noise." In the visual reproduction of transmitted television images, these interfering signals cause image distortions which spoil the appearance of the produced image.

The major object of the present invention is to eliminate interfering signals of the kind mentioned above from the demodulated output of radio receiving apparatus.

Another object of the invention is to provide for the elimination of frequency and phase modulation effects in the production of an image in a television receiver.

A further object is to provide an arrangement in a radio receiver for producing phase or frequency shifts of a local oscillator to offset the effect of phase or frequency shifts in a received signal.

A still further object is to provide a novel arrangement including an oscillator and an associated reactance tube for shifting the oscillator frequency to compensate for frequency changes in a signal wave.

Figure 1:
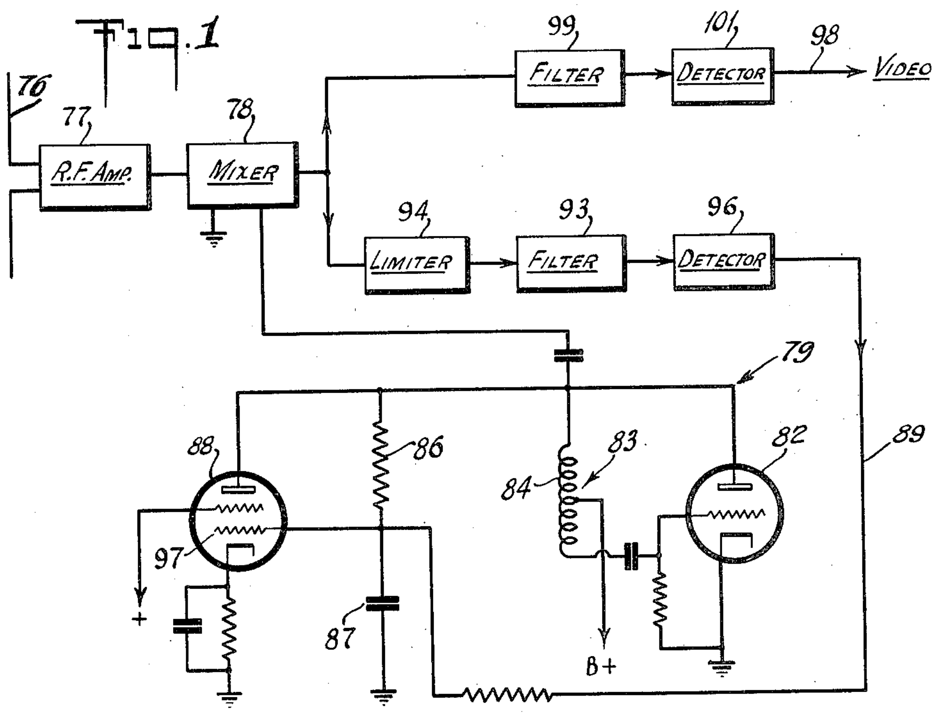
Figure 2:
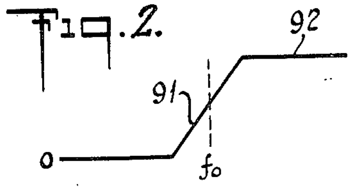

Other and more specific objects of the invention will become apparent and suggest themselves to those skilled in the art to which the invention is directed upon reading the following specification and claim in connection with the drawings in which:

Fig. 1 is a schematic block diagram of an electric wave receiver embodying the invention and being suitable for use as a television receiver; and Fig. 2 shows the filtering characteristic of the filters of Fig. 1.

Referring to Fig. 1, there are shown the principal elements of a television receiver which may be similar in detail to that shown in Fig. 6 of Patent No. 2,300,501, granted to G. L. Grundmann on November 3, 1942. The receiver is of the superheterodyne type, comprising a radio frequency amplifier 77 fed from a communication channel, transmission line or antenna indicated at 76, a first detector or mixer stage 78, and an oscillator indicated generally by reference character 79.

The oscillator 79 includes an oscillator tube 82 which provides the locally generated frequency to be supplied in operation of the system to the mixer 78 wherein correction for distortion due to phase or frequency shifts in the signal carrier is obtained. A tuned circuit or network, in general of the "Hartley" type, is indicated by the reference character 83 and comprises an inductance 84 having two coupled sections and a circuit including a resistor 86 and a condenser 87 which serves to tune the inductance 84. The oscillation frequency may be controlled by a range switch and its associated circuits or an adjustable inductance or capacity (not shown) or it may be changed in any other suitable manner. The resistance 86 has a high value as compared with the capacity of the condenser 87.

A reactance tube 88 provides a fast acting automatic frequency control on the oscillator tube 82. The frequency of the oscillator 82 is shifted by means of the tube 88 so that the unwanted frequency or phase modulation in the received signal, as detected on the slope 91 of the response characteristic 92 of a filter 93, is materially reduced or substantially eliminated.

The derivation of the control voltage applied to the reactance tube 88 by way of a conductor 89 may be obtained as shown by taking a portion of the output from the mixer 78 and passing it through a limiter 94 to remove the amplitude modulation. The resulting substantially square topped wave, which contains the unwanted frequency or phase modulation, is applied to the previously mentioned filter 93 which provides substantially 50 per cent response at the intermediate carrier frequency $f_0$ as indicated on Fig. 2. The unwanted changes in phase or frequency appear as amplitude modulations in the output of the filter 93 and are detected in a detector 96 before being applied to the control grid 97 of the reactance tube 88 by way of the conductor 89. The polarity of the signal appearing in the conductor 89 is such that a shift of the oscillator frequency produced by the reactance tube limits undesired frequency modulations.

The circuits of the reactance tube 88, the oscillator, filter, etc., are preferably broadly tuned so as to keep the delay small and thereby provide fast acting frequency changes of the oscillator 79 to counteract the unwanted phase or frequency shifts of the incoming signal.

The mixer 78 feeds desired signals to the final output connection 98 by way of a filter 99, and a detector 101. The connection 98, it will be understood, is in communication in the usual manner with a translating device such as image producing apparatus when the receiver of Fig. 1 is used as a television receiver. The term "image" as used herein refers to the representation of a view, picture, object, map, plan, or any other subject matter. The usual sound equipment is, or may be employed, but since it forms no part of the present invention, it is not shown. Electrical signals representing the sound accompaniment may be prevented from appearing in the output connection 98 in the manner pointed out in the Grundmann patent above referred to. If desired, intermediate frequency amplification may be employed between the filter 99 and the detector 101. The characteristic of the filter 99 is like that shown in Fig. 2.

Having now described the invention, what is claimed and desired to be secured by Letters Patent is the following:

A receiving system for electric waves comprising means for selecting a desired signal modulated wave having randomly occurring frequency modulations, an oscillator, a mixer stage following the signal selecting means for deriving an intermediate frequency signal from the desired signal, a branched circuit, one branch of said branched circuit comprising a limiter to limit the successive peaks of a selected wave to a substantially uniform value, detuned filtering means coupled to the output of said limiter, said filtering means serving to produce amplitude variations in accordance with said randomly occurring modulations, a wave detector connected to the output of said filtering means, a reactance tube, means whereby the reactance tube is effective to vary the frequency of said oscillator, a connection from said wave detector to vary the effectiveness of the reactance tube, another branch of said branched circuit including a second detuned filtering means for passing the amplitude varying signals of the selected wave which have been freed from the effects of randomly occurring modulations, and a wave detector connected to the output of said second-named filtering means for producing signals capable of causing operation of a reproducing device.

THOMAS L. GOTTIER.

REFERENCES CITED

The following references are of record in the file of this patent:

UNITED STATES PATENTS

| Number | Name | Date |
|---|---|---|
| 2,205,762 | Hansell | June 25, 1940 |
| 2,206,695 | Guanella | July 2, 1940 |
| 2,273,097 | Foster | Feb. 17, 1942 |
| 2,316,017 | Peterson | Apr. 6, 1943 |
| 2,316,317 | Curtis | Apr. 13, 1943 |
| 2,354,827 | Peterson | Aug. 1, 1944 |